(12) United States Patent
Greenzeiger et al.

(10) Patent No.: US 9,965,478 B1
(45) Date of Patent: May 8, 2018

(54) AUTOMATIC GENERATION OF ONLINE MEDIA STATIONS CUSTOMIZED TO INDIVIDUAL USERS

(71) Applicant: Apple Inc., Cupertino, CA (US)

(72) Inventors: Michael Froimowitz Greenzeiger, Sunnyvale, CA (US); Ayman Khalil, San Francisco, CA (US); Greg Labmeier, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days. days.

(21) Appl. No.: 14/861,790

(22) Filed: Sep. 22, 2015

Related U.S. Application Data (63) Continuation of application No. 14/249,252, filed on Apr. 9, 2014, now abandoned.

(51) Int. Cl.
   *G06F 7/00* (2006.01)
   *G07F 17/30* (2006.01)
   *G06F 17/30* (2006.01)

(52) U.S. Cl.
   CPC .. *G06F 17/30056* (2013.01); *G06F 17/30029* (2013.01); *G06F 17/3074* (2013.01); *G06F 17/30705* (2013.01); *G06F 17/30867* (2013.01)

(58) Field of Classification Search
   CPC ........... G06F 17/30029; G06F 17/3074; G06F 17/30867
   See application file for complete search history.

(56) References Cited

U.S. PATENT DOCUMENTS

| | | | |
|---|---|---|---|
| 7,783,623 B2 | 8/2010 | Acharya | |
| 8,577,874 B2 | 11/2013 | Svendsen et al. | |
| 8,667,161 B2 | 3/2014 | De Bonet et al. | |
| 2003/0014407 A1* | 1/2003 | Blatter | G06F 17/30017 |
| 2003/0105682 A1* | 6/2003 | Dicker | G06Q 30/02 |
| | | | 705/26.8 |
| 2004/0142676 A1* | 7/2004 | Sim | H04B 1/207 |
| | | | 455/351 |
| 2012/0054216 A1* | 3/2012 | Haahr | G06F 17/30648 |
| | | | 707/765 |
| 2012/0109778 A1* | 5/2012 | Chan | G06Q 30/02 |
| | | | 705/26.7 |
| 2012/0254256 A1* | 10/2012 | Martin | G11B 27/034 |
| | | | 707/803 |
| 2013/0246385 A1* | 9/2013 | Barlin | G06F 17/30867 |
| | | | 707/706 |

(Continued)

Primary Examiner — Charles Lu
(74) Attorney, Agent, or Firm — Polsinelli PC (57) ABSTRACT

An online media station can be automatically generated based on a user's media preference data. Media preference data can include a user's media item purchase history. The media preference data is analyzed and media preference clusters are generated from the analyzed media preference data. Generated media preference clusters are ranked based on a predetermined set of ranking rules. The top ranked media preference clusters are selected dependent upon the user's number of slots available for customized media stations. One or more media station seeds are selected from each media preference cluster selected based on a set of predetermined selection rules. An algorithmic media station is automatically generated from the one or more media station seeds and provided to an electronic device of the user.

24 Claims, 5 Drawing Sheets

(56) References Cited

U.S. PATENT DOCUMENTS

2013/0339434 A1* 12/2013 Nogues ............ G06F 17/30749
                                                    709/204
2014/0073236 A1    3/2014  Iyer
2014/0074846 A1    3/2014  Moss et al.

* cited by examiner

AUTOMATIC GENERATION OF ONLINE MEDIA STATIONS CUSTOMIZED TO INDIVIDUAL USERS

CROSS REFERENCE TO RELATED APPLICATIONS

This application is a continuation of, and claims the benefit of priority to, U.S. application Ser. No. 14/249,252, filed on Apr. 9, 2014, which is expressly incorporated by reference herein in its entirety.

TECHNICAL FIELD

The present disclosure relates to media stations and more specifically to the automatic generation of media stations customized to individual users.

BACKGROUND

Traditional media stations, such as online radio stations, are a music streaming and automated music recommendation service, typically provided via an online web browser or computer application. Online media stations are an increasingly popular medium for distributing music content over the internet. Online media stations play musical selections of a certain genre based on a user's artist selection. The user may provide positive or negative feedback for songs chosen by the online media station, which are taken into account when the online media station selects future songs. Other online media stations similar to the online media station selected by the user are recommended to the user based on the musical artist the user originally selected.

As online media stations become more popular a wider variety of customers begin to engage with online media stations. Users can create online media stations and have the best results when they are involved in creating the online media station. However, not all customers are technically savvy enough to create their own online media station with satisfactory results. Additionally, technically savvy customers may not be willing to put in the initial time and effort into tuning their stations during the early stage of usage. Accordingly, an improved method of generating online media stations is needed.

The present disclosure recognizes that the use of personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, devices, and non-transitory computer-readable storage media for automatically generating online media stations. To automatically generate an online media station, a user's media preference data is analyzed to create media preference clusters. In some embodiments the media preference clusters can be created using a clustering algorithm such as a k-means algorithm.

The media preference clusters are ranked according to a set of predetermined rules. In some embodiments the media preference clusters are ranked according to the characteristics of the media items contained within the clusters. In some embodiments the media preference clusters are ranked according to a user's interaction with the media items contained within the clusters. In other embodiments, the media preference clusters are ranked according to the characteristics of the clusters themselves.

The top ranked media preference clusters are selected for media station generation depending on the user's number of slots available for customized media stations. Each media preference cluster selected is used to generate a corresponding media station.

A media station seed selection module selects one or more media station seeds from each media preference cluster selected. The selected media station seed or seeds are used as inputs into a media station generation module. Using the media station seed or seeds as inputs, the media station generation module automatically generates an online media station customized for the user.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for automatically generating online media stations based on a user's media preference data. To automatically generate an online media station, a user's media preference data is analyzed to create media preference clusters. In some embodiments the media preference clusters can be created using a clustering algorithm such as a k-means algorithm.

The media preference clusters are ranked according to a set of predetermined ranking rules. In some embodiments, the media preference clusters are ranked according to the characteristics of the media items contained within the clusters. In some embodiments, the media preference clusters are ranked according to a user's interaction with the media items contained within the clusters. In some embodiments, the media preference clusters are ranked according to the characteristics of the clusters themselves.

The top ranked media preference clusters are selected for media station generation depending on the user's number of slots available for customized media stations. Each media preference cluster selected is used to generate a corresponding media station.

A media station seed selection module selects one or more media station seeds from each media preference cluster selected. The selected media station seed or seeds are used as inputs into a media station generation module. Using the selected media station seed or seeds as inputs, the media station generation module automatically generates online media stations customized for the user.

Figure 1:
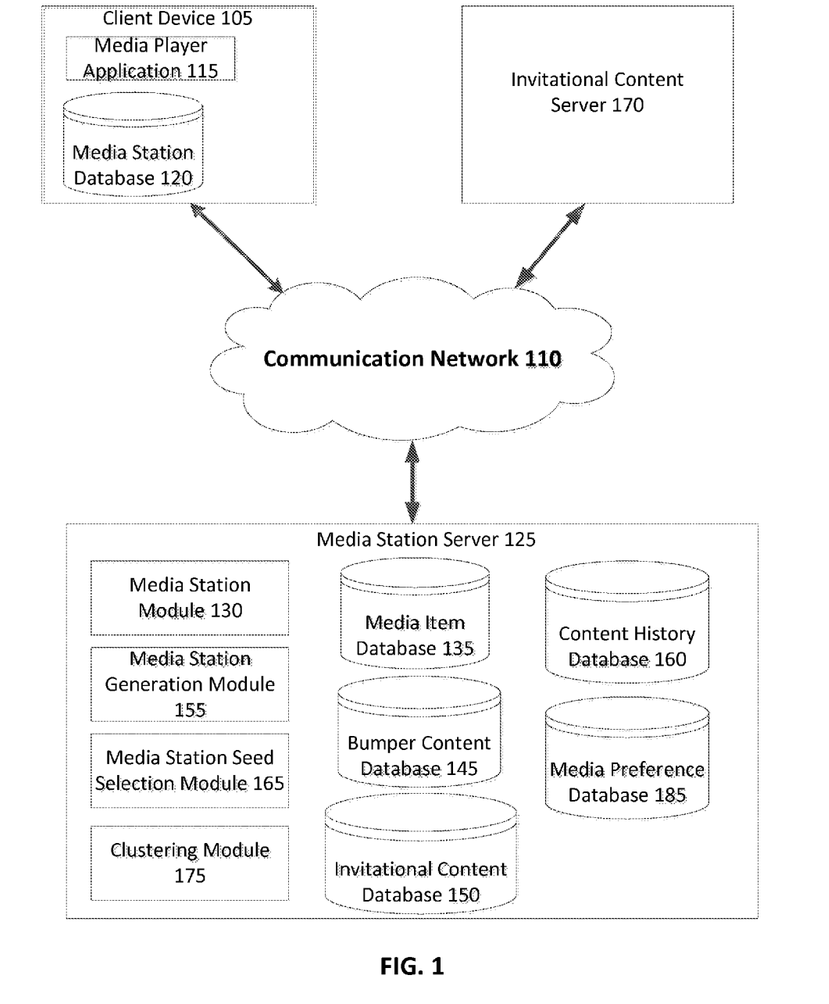
FIG. 1 illustrates a general purpose computing environment in which multiple computing devices can be configured to communicate with each other to automatically generate media stations.

FIG. 1 illustrates an exemplary system configuration 100 in which multiple computing devices can be configured to communicate with each other to create and perform a media station on a client device. A media station can be a sequence of media items that can be played or executed by a media station player application on a client device. Some non-limiting examples of media items can include songs, podcasts, television shows, movies, games, audiobooks, educational courses, and/or video. Other media items are also possible. A media station player can be any application capable of media item playback, such as a component of a webpage, a plug-in, a client-side application, etc.

In some embodiments, a media station can be a continuous sequence of media items that are chosen by a media station creation algorithm, such that as one media item completes playback a next media item begins. The playback process of a continuous media item stream can continue until a user takes an action to terminate or temporarily delay the playback, such as quitting the media player application, switching to a different media station, pausing playback, or skipping a media item. A media station can be homogeneous or heterogeneous. That is, a media station can be designed to playback media items all of the same media type or of different media types. For example, a homogeneous media station can playback only audio media items or only video media items. In another example, a heterogeneous media station can playback a mix of audio media items and video media items. In some embodiments, the various media items can be presented concurrently such that presentation of one media item overlaps with presentation with a different media item.

A user can create a media station by selecting a media station seed or seeds from which to generate the media station. Some non-limiting examples of media station seeds are songs, videos, artists, albums, a genre of music or film, actors, etc. The media station plays algorithmic selections of a certain genre based on the user's initial selection. The user then provides positive or negative feedback for media items chosen by the media station, which are taken into account when the media station selects future media items. Typically, a user experiences the best results for media stations generated when the user provides his own media station seed or seeds to generate the media station from.

In some instances, a user has not provided a media station seed or seeds to generate a media station from. The user may either be too busy to take the time to make a selection or may not be technically savvy enough to create their own online media station with satisfactory results. Additionally, technically savvy customers may not be willing to put in the initial time and effort into tuning their stations during the early stage of usage.

To provide the benefits of a customized online media station to the user, a customized online media station may be automatically generated without requiring a user to select a media station seed or seeds. By identifying relationships between the media items in a users media preference data, clusters of media items may be created to reflect different groups and genres among the media items. Some non-limiting examples of media preference data are a user's purchase history of music, a user's purchase history of applications, a user's purchase history of videos, songs and videos contained within a user's media library, etc. The clusters of media items may be ranked to identify the clusters closest related to the user's media preference. The top ranked media preference clusters are selected for media station generation depending on the user's number of slots available for customized media stations. Each media preference cluster selected is used to generate a corresponding media station.

One or more media station seeds may be selected from each media preference cluster selected. The selected media station seed or seeds may in turn be used as inputs to automatically generate online media stations. The online media stations generated are automatically provided to the user without requiring the user to select a media station seed or seeds.

To accomplish this, the user's media item purchase history may be analyzed to create media preference clusters. The media preference clusters created indicate a relationship between the media items analyzed in the users purchase history. The media preference clusters can be created using a clustering algorithm such as a k-means algorithm, etc.

The media preference clusters are ranked according to a set of predetermined rules to identify the clusters that are most closely related to the user's media preference. In some embodiments, the media preference clusters are ranked according to the characteristics of the media items contained within the clusters. In other embodiments, the media preference clusters are ranked according to a user's interaction with the media items contained within the clusters. In other embodiments, the media preference clusters are ranked according to the characteristics of the clusters themselves.

For example, the media preference clusters may be ranked according to the number of media items contained within the clusters. In some embodiments, the media preference clusters may be ranked according to the clusters with the most recently played media items. In some embodiments, the media preference clusters may be ranked according to the clusters with the most recently purchased media items. In some embodiments, media preference clusters may be ranked according to billboard popularity of the artists within the cluster. Additional priority may be provided to media preference clusters that include artists who are identified as heat seekers or artists that are already members of a preexisting editorial station. A heat seeker artist is a new and developing artist that has been identified or highlighted for sales. In some embodiments, the media preference clusters may be ranked according to the clusters with the most media items with high user ratings.

The top ranked media preference clusters are selected for media station generation depending on the user's number of slots available for customized media stations. Each media preference cluster selected is used to generate a corresponding media station.

A media station seed selection module selects one or more media station seeds from each media preference cluster selected. The media station seed or seeds selected are used as inputs into a media station generation module. Using the media station seed or seeds as inputs, the media station generation module automatically generates online media stations customized for the user.

In some embodiments, user media item purchase data either is not available or does not exist for a given user. In this scenario, alternative inputs are analyzed to generate media preference clusters for the user. For example, application purchase data of a given user may be used as an alternative to user media item purchase history to generate media preference clusters. In some embodiments, the songs in a user's media library could also be used to generate media preference clusters for the user. In other embodiments, media item play data and media item purchase data from users with matching gender, age range, and geographical location are pooled and used to generate media preference clusters for the user.

A media station can also be configured to play or present invitational content, such as advertisements, within the media stream. An invitational content item can include content found in a media item, such as a song or a video, but an invitational content item can also include targeted content and/or content designed to elicit a response from a user. Therefore an invitational content item and a media item can be distinct item types, each of which can be presented in a media station.

In some embodiments, the invitational content can be used as a source of revenue and/or to subsidize a media station so that the media items can be provided to end users free of charge or for a reduced fee. The invitational content can be presented within a media station using a variety of techniques. In some cases, invitational content can be presented to a user in a manner that prevents or blocks the playback of a next media item or a next segment of a media item. For example, upon the completion of the playback of a music item, but before beginning playback of a new music item, an invitational content item can be presented in the media stream. Invitational content can also be displayed in conjunction with a media item or media item representation. For example, an invitational content item can be presented in a banner ad displayed with a music album cover or during the playback of a television show.

Further, in some embodiments, the invitational content can include an interactive segment that can be presented concurrently with one or more media items. The interactive segment can be configured such that a user can interact with the invitational content without disrupting playback of media items being presented concurrently. A user can thus interact with various features and views of the interactive segment during the playback of a media item without disrupting the media item. For example, in some embodiments, the interactive segment can be a rich media advertisement that includes various views and screens which a user can navigate through while listening to an audio media item.

A downside to presenting both invitational content and media items, either simultaneously or sequentially, when the invitational content is not related to the media items is that a user may equate the media item with the invitational content. For example, a user may think that an invitational content provider endorses a particular media item, or that a media item provider has authorized the use of the media item to promote an offering associated with the invitational content. To decrease the potential for confusion, the media station can also include bumper content, which can be presented concurrently with the interactive invitational content, but just prior to resuming playback of a media item.

A bumper content item can be an intermediary content item that is used to transition from invitational content to a media item, thereby creating user awareness that the media item is not related to an item of invitational content that the user may also be experiencing. For example, a bumper content item can be an audio message such as "now back to the music" that is used to transition between invitational content to an audio media item. Thus a user that is interacting with the interactive segment of an item of invitational content will be made aware that the upcoming media item is not related to the item of invitational content, even though the user is experiencing both concurrently.

To facilitate providing a media station to be performed by a client device, multiple computing devices can be connected to a communication network 110 and configured to communicate with each other through use of the communication network 110. The communication network 110 can be any type of network, including a local area network ("LAN"), such as an intranet, a wide area network ("WAN"), such as the internet, or any combination thereof. Further, the communication network 110 can be a public network, a private network, or a combination thereof. The communication network can also be implemented using any type or types of physical media, including wired communication paths and wireless communication paths associated with one or more service providers. Additionally, the communication network 110 can be configured to support the transmission of messages formatted using a variety of protocols.

A computing device can be any type of general computing device capable of network communication with other computing devices. For example, the computing device can be a personal computing device such as a desktop or workstation, a business server, or a portable computing device, such as a laptop, smart phone, or tablet personal computer. The computing device can include some or all of the features, components, and peripherals of computing device 500 of FIG. 5A.

To facilitate communication with other computing devices, the computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

As illustrated, a client device 105 can be configured to communicate with a media station server 125 to perform a media station on the client device 105. For example, a media player application 115 running on the client device 105 can be configured to communicate with a media station module 130 on the media station server 125 to request, receive and perform a media station. A media station player can be any application capable of media item playback, such as a component of a webpage, a plug-in, a client-side application, etc.

The media station module 130 can be configured to create a media station to be performed on a client device. For example, the media station module 130 can be configured to assemble the media station by selecting media items, invitational content items and bumper items to be performed on the client device in a specified order. For example, the media station server 125 can include a media item database 135, a bumper content database 145 and an invitational content database 150, each configured to store multiple media items, bumper content items, and invitational content items respectively. The media station module 130 can be configured to communicate with the databases to select media items, bumper content items and invitational content to be performed as part of the media station.

Although the media item database 135, bumper content database 145 and the invitational content database 150 are illustrated separately, this is just one possible embodiment and is not meant to be limiting. In some embodiments, the databases can be combined as one database or any other possible combination.

Alternatively, in some embodiments, the multiple databases can be hosted on separate computing devices and the media station module 130 can be configured to communicate with the various computing devices to assemble the media station. For example, in some embodiments, the system can include an invitational content server 170 in network communication with the media station server 125 and the media station module 130 can be configured to communicate with the invitational content server 170 to request invitational content to be included in the media station. In some embodiments, the invitational content server 170 can transmit the invitational content to the media station server 125 where it can be assembled into the media station. In some embodiments, the invitational content server 170 can transmit the invitational content directly to the client device 105.

In some embodiments, the media station module 130 can be configured to transmit the assembled media station to the client device 105 where it can be performed by the media player application 115. For example, the media station module 130 can be in continuous communication with the media player application 115 to transmit the media station to be performed by the media player application 115.

In some embodiments, the media station module 130 can be configured to transmit the media station to the client device 105 in segments. For example, the media station module 130 can be configured to communicate with the client device to transmit an assembled segment of the media station which can be stored on the client device 105 and performed by the media player application 115. For example, the client device 105 can include a media station database 120 configured to store the received media station and the media player application 115 can be configured to communicate with the media station database 120 to retrieve the stored media station. In this type embodiment, the media station module 130 can be configured to periodically update the client device 105 by transmitting further assembled segments of the media station.

In some embodiments, the media station can be assembled at the client device 105 rather than at the media station server 125. For example, the media station module 130 can be running on the client device 105 and can be configured to request media items, bumper content items and invitational content from the media station server 125, or any other computing device. The received media items, bumper content items and invitational content can be stored in the media station database 120 and the media station module 130 can be configured to communicate with the media station database 120 to retrieve the stored media items, bumper content items and invitational content to assemble the media station. In this type of embodiment, the media station module 130 running on the client device 105 can be configured to periodically request further media items, bumper content items and invitational content to be delivered to the client device.

The media station module 130 can be configured to assemble the media station based upon media station assembly rules. The media station assembly rules can dictate which media items, invitation content items and bumper content items should be selected for the media station as well as the sequential order in which they should be presented by the media player application 115.

In some embodiments, a media station customized to a user may be created automatically without requiring any user input of media station seeds. In some embodiments, the user's media item purchase history may be analyzed to create media preference clusters. The media preference clusters are ranked according to a set of predetermined rules to identify the clusters that are most closely related to the user's media preference. The top ranked media preference clusters are selected for media station generation depending on the user's number of slots available for customized media stations. Each media preference cluster selected is used to generate a corresponding media station. Media station seed selection module 165 selects one or more media station seeds from each media preference cluster selected. The selected media station seed or seeds are used as inputs into media station generation module 155. Using the media station seed or seeds as inputs, the media station generation module 155 automatically generates online media stations customized for the user. The media station generation module 155 can be configured to create a customized media station to be performed on a client device.

To accomplish this, media station server 125 can include clustering module 175 configured to create media preference clusters from a user's media preference data. Media preference data can be any data that indicates a user's media preferences, i.e. likes and/or dislikes regarding media items. Some non-limiting examples of media preference data are a users purchase history of music, a users purchase history of applications, a users purchase history of videos, songs and videos contained within a users media library, positive or negative feedback for media items, media stations a user has created in the past, etc.

To create the media preference clusters, clustering module 175 can be configured to use media preference data gathered from the user. In some embodiments, media station server 125 can include media preference database 185, which is configured to store media preference data gathered from the user. Clustering module 175 can be configured to create the media preference clusters using any clustering method known in the art. For example, in some embodiments, the media preference clusters can be created using a k-means algorithm. Clustering module 175 can create the media preference clusters by using the media preference data as input in the k-means algorithm. For example, the media preference data gathered from the user can represent a unique data point or observation, and clustering module 175 can use a k-means algorithm to cluster the various observations. The resulting clusters can be the media preference clusters. In some embodiments, purchased media items are clustered in n-space using genre, mood, era, origin, and tempo using metadata with multiple possible dimensions for each of these categories. For example, in terms of the genre category, an analyzed song may be determined to be 70% rock, 20% hip hop and 10% country. This data forms a matrix in which songs are classified using any number of standardized clustering algorithms.

In some embodiments, user media item purchase data either is not available or does not exist for a given user. In this scenario, media preference data includes alternative inputs which are analyzed to generate media preference clusters for the user. For example, application purchase data of a given user may be used as an alternative to user media item purchase history to generate media preference clusters. In some embodiments, the songs in a user's media library could also be used to generate media preference clusters for the user. In other embodiments, media item play data and media item purchase data from users with matching gender, age range, and geographical location are pooled and used to generate media preference clusters for the user.

Figure 2:
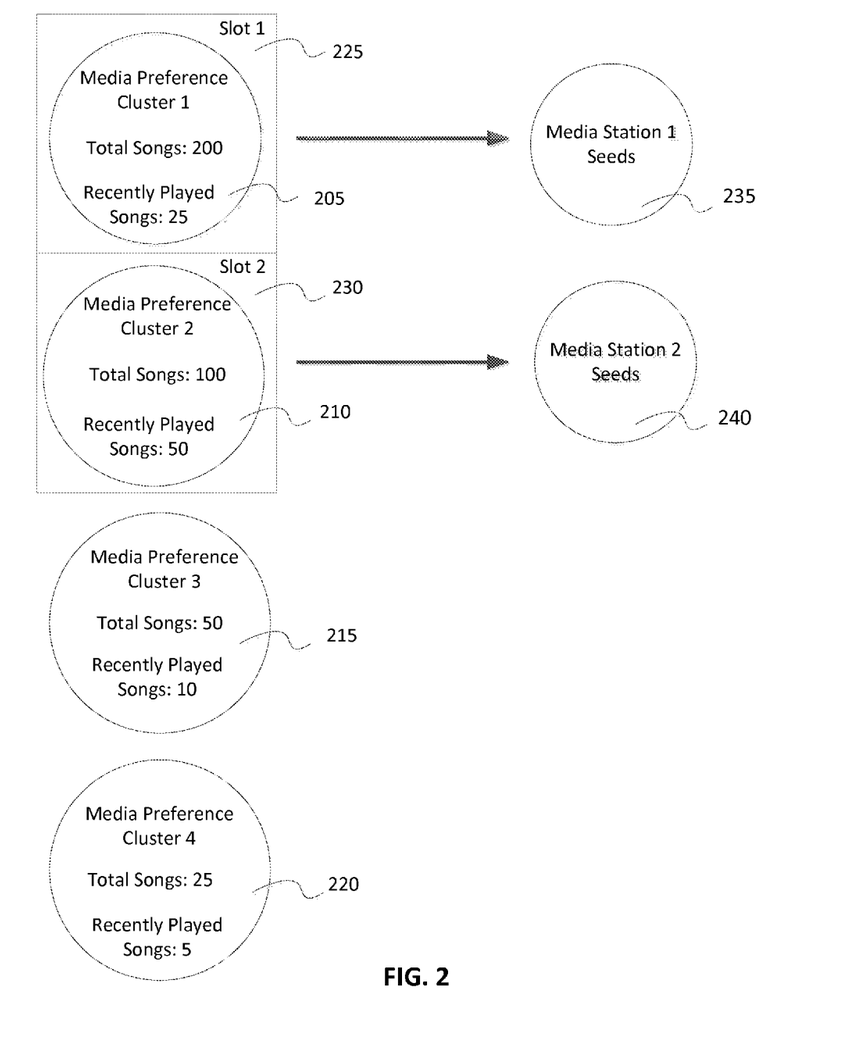
FIG. 2 illustrates ranking media preference clusters, selecting media preference clusters for media station generation, and selecting a media station seed or seeds from each media preference cluster selected.

FIG. 2 illustrates automatically generating media preference clusters from a users media preference data, ranking the media preference clusters, selecting the media preference clusters, and selecting one or more media station seeds from each media preference cluster selected. As shown, four media preference clusters 205, 210, 215, and 220 have been generated using clustering module 175 and the media preference database 185. For the purposes of this illustration, media preference clusters have all been generated from the user's media preference data specifically, the user's purchase history.

The media preference clusters are ranked according to a set of predetermined ranking rules. In some embodiments the media preference clusters are ranked according to the characteristics of the media items contained within the clusters. In other embodiments the media preference clusters are ranked according to a users interaction with the media items contained within the clusters. In other embodiments, the media preference clusters are ranked according to the characteristics of the clusters themselves.

For example, the media preference clusters may be ranked according to the number of media items contained within the clusters. In some embodiments, the media preference clusters may be ranked according to the clusters with the most recently played media items. In some embodiments, the media preference clusters may be ranked according to the clusters with the most recently purchased media items. In some embodiments, media preference clusters may be ranked according to billboard popularity of the artists within the cluster. Additional priority may be provided to media preference clusters that include artists who are identified as heat seekers or artists that are already members of a preexisting editorial station. A heat seeker artist is a new and developing artist that has been identified or highlighted for sales. In some embodiments, the media preference clusters may be ranked according to the clusters with the most media items with high user ratings.

The four media preference clusters 205, 210, 215 and 220 all include media items found within the users analyzed purchase history. In this illustration, the generated media preference clusters each reflect a specific genre of music, and the media items contained within the clusters have characteristics that lend themselves to the genre of music of the cluster.

As illustrated by slot 1 225 and slot 2 230, two slots are available for the user's custom stations. Media preference clusters 205 and 210 have been selected as the top ranked clusters and thus are placed in the two available slots for the user's custom stations. Media preference cluster 205 achieved the highest ranking by containing the highest number of songs among the four clusters. Media preference cluster 210 did not contain as many songs as media preference cluster 205. However, although media preference cluster 210 is a smaller cluster in size compared to media preference cluster 205, media preference cluster 210 also achieved a high ranking because it contained the most songs which were recently played within a cluster. As such, media preference clusters 205 and 210 are selected as the top ranked clusters from which media station seed or seeds 235 and 240 are selected from.

The media station seed or seeds 235 and 240 are selected from their corresponding media preference clusters 205 and 210 respectively by a set of predetermined selection rules. Some non-limiting examples of media station seeds are songs, videos, artists, albums, genres of music or film, actors, etc. In some embodiments, the media selection rules can dictate selecting a media station seed or seeds based on the number of instances of the media station seed in a media preference cluster. For example, a media station seed such as an artist can be selected based on the number of media items authored by the artist that are in the media preference cluster.

In some embodiments, the media selection rules can dictate selecting a media station seed or seeds based on whether a media station seed has been designated as a heat seeker. For example, the media selection rules can dictate that artists and/or songs designated as a heat seeker be selected as a media station seed. In some embodiments, the media selection rules can dictate selecting a media station seed or seeds based on the popularity of a media item. For example, the media selection rules can dictate that artists and/or songs designated as billboard top 100 be selected as a media station seed. In other instances, there may be some minimum threshold value of occurrence within a cluster that an artist must overcome to be considered as a candidate for selection as a media station seed.

In some embodiments, one or more media station seeds 235 and 240 may be selected to seed the media station generation module 155. In some instances, selecting multiple media station seeds 235 and 240 provides superior results in creating a customized media station. For example, selecting multiple artists as media station seeds that have a long discography record of music in multiple styles or genres provide superior results because the multiple artists cause the customized station to hone in on the subset of music from the artist which the user prefers.

In some embodiments, only one media station seed 235 and 240 may be selected to seed the media station generation module 155. In some instances, the generated media preference clusters may only yield one media station seed due to the amount of media preference data available. Although utilizing multiple media stations to seed the media station generation module is the preferred approach, a media station may still be generated with only one media station seed.

Figure 3:
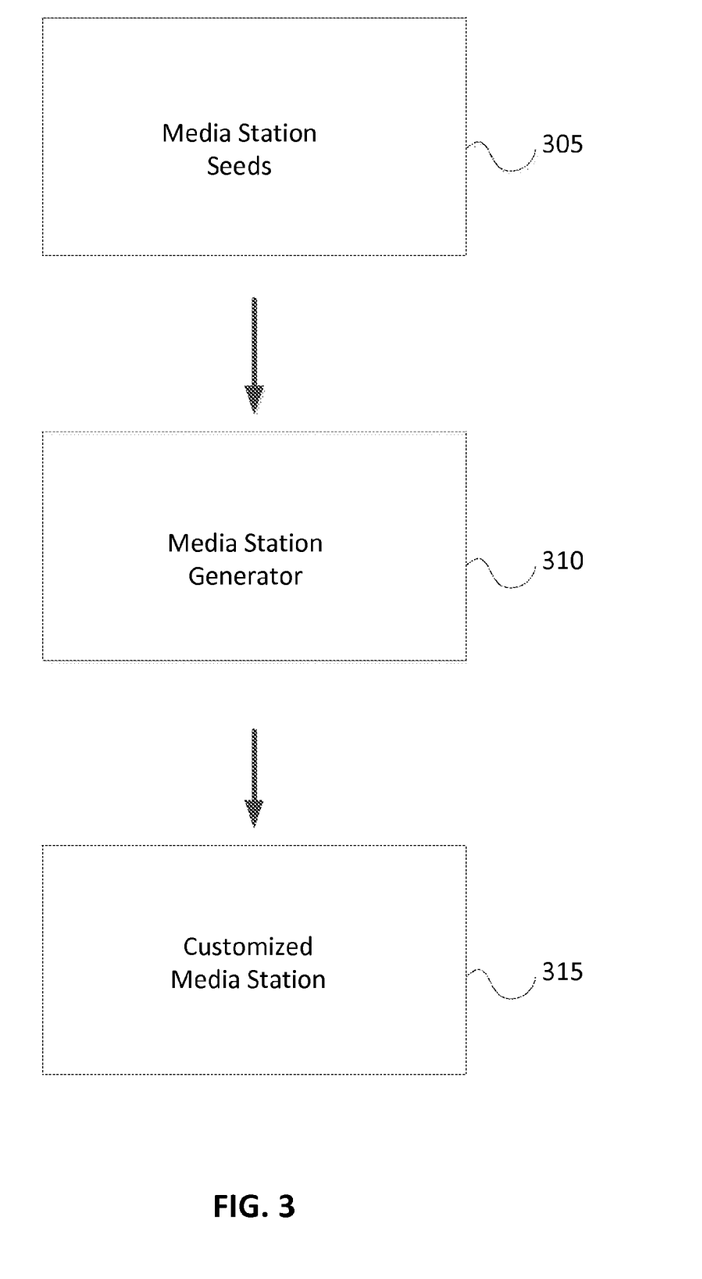
FIG. 3 illustrates automatically generating online media stations customized for the user from the selected media station seed or seeds.

FIG. 3 illustrates automatically providing a media station seed or seeds to the media station generator to automatically generate a customized media station for a user. In some embodiments, a media station seed or seeds 305 are selected from generated media preference clusters 205, 210, 215 and 220. Some non-limiting examples of media station seeds are songs, videos, artists, albums, genres of music or film, actors, etc.

In some embodiments, multiple media station seeds are selected from generated media preference clusters 205 and 210. Utilizing multiple seeds may provide superior media station generation results because the media station generation module 155 can more accurately hone in on the subset of the music from the artists which the user prefers.

As illustrated, the media station seed or seeds 305 are provided to the media station generator 310 as inputs for automatically generating a customized media station. In some embodiments the media station generator 310 generates algorithmic media stations. The media station generator can be configured to generate an algorithmic media station based on an algorithm that uses one or more media station seeds 305 as input. For example, when provided with a media station seed such as an artist, the media station generation module can generate a media station including media items authored by the seed artist as well as media items authored by the artists determined to be similar or related to the provided seed artist. Likewise, when provided with a media station seed such as a song, the media station generation module can generate a media station that includes the seed song as well as songs that are similar to the provided seed song.

The media station generator 310, using the media station seed or seeds 305 as inputs, automatically generates a customized media station for the user. The customized media station 315 created can be performed on a client device. The customized media station 315 created may be an algorithmic media station providing a sequence of media items that can be played or executed by a media station player application on a client device.

In some embodiments, an existing editorial station that has a similar profile i.e. genre, mood, era, etc., to the cluster of songs used for media station generation or the media station seeds used for media station generation may be substituted in place of a customized algorithmic media station.

Figure 4:
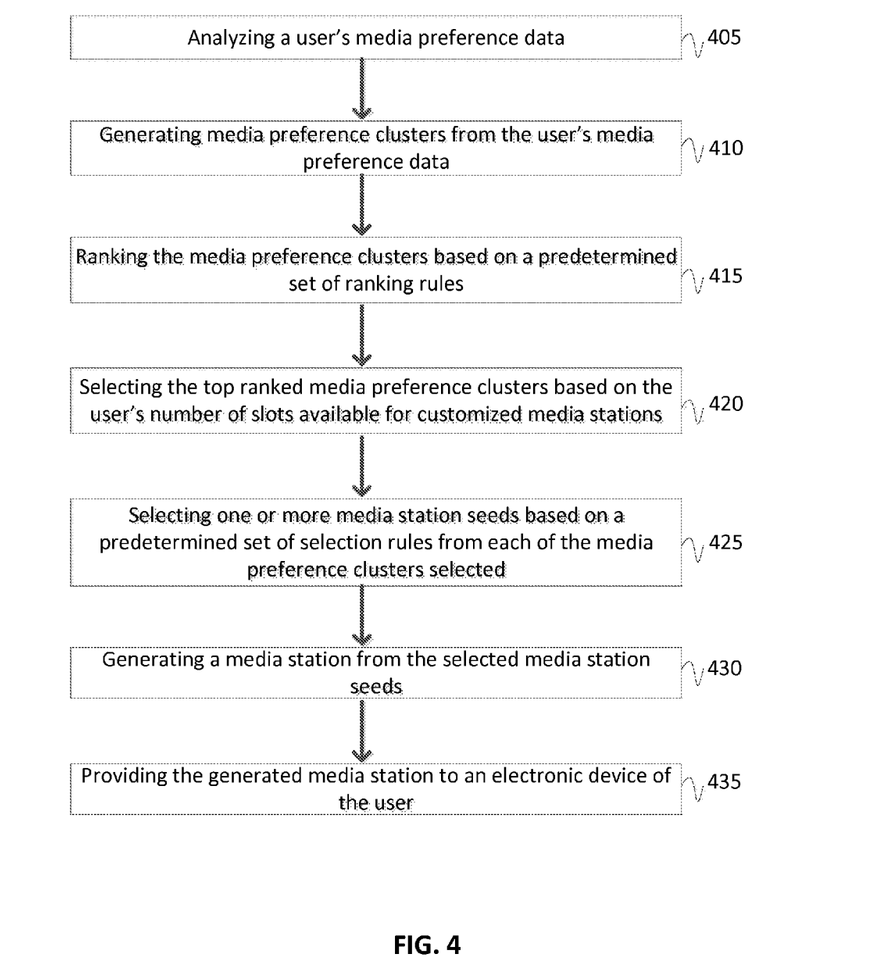
FIG. 4 illustrates an exemplary method embodiment of automatically generating online media stations customized for the user.

FIG. 4 illustrates an exemplary method embodiment of automatically generating an online media station for a user. As shown, the method begins at block 405 where a user's media preference data is analyzed. Some non-limiting examples of media preference data are a user's purchase history of music, a user's purchase history of applications, a user's purchase history of videos, songs and videos contained within a users media library, etc. In some embodiments, user media item purchase data either is not available or does not exist for a given user. In this scenario, alternative inputs are analyzed to generate media preference clusters for the user. For example, application purchase data of a given user may be used as an alternative to user media item purchase history to generate media preference clusters. In some instances, the songs in a user's media library could also be used to generate media preference clusters for the user. In other embodiments, media item plays from users with matching gender, age range, and geographical location are pooled and used to generate media preference clusters for the user.

Upon analyzing the user's media preference data, the method continues to block 410 where media preference clusters are generated from the user's media preference data. To generate the media preference clusters, clustering module 175 can be configured to use media preference data gathered from the user. In some embodiments, media station server 125 can include media preference database 185, which is configured to store media preference data gathered from the user. Clustering module 175 can be configured to create the media preference clusters using any clustering method known in the art. For example, in some embodiments, the media preference clusters can be created using a k-means algorithm. Clustering module 175 can create the media preference clusters by using the media preference data as input in the k-means algorithm. For example, the media preference data gathered from the user can represent a unique data point or observation, and clustering module 175 can use a k-means algorithm to cluster the various observations. The resulting clusters can be the media preference clusters.

At block 415 the generated media preference clusters are ranked according to a set of predetermined ranking rules. In some embodiments the media preference clusters are ranked according to the characteristics of the media items contained within the clusters. In other embodiments the media preference clusters are ranked according to a user's interaction with the media items contained within the clusters. In other embodiments, the media preference clusters are ranked according to the characteristics of the clusters themselves.

For example, the media preference clusters may be ranked according to the number of media items contained within the clusters. In other embodiments, the media items may be ranked according to the clusters with the most recently played media items. In some embodiments, the media preference clusters may be ranked according to the clusters with the most recently purchased media items. In some embodiments, media preference clusters may be ranked according to how popular the artists are within the cluster. Additional priority may be provided to artists who are identified as heat seekers or artists that are already members of a preexisting editorial station. A heat seeker artist is a new and developing artist that has been identified or highlighted for sales.

Upon ranking the generated media preference clusters, the method continues to block 420 where the top ranked media preference clusters are selected for media station generation depending on the user's number of slots available for customized media stations. Each media preference cluster selected is used to generate a corresponding media station.

Upon selecting the media preference clusters to generate a media station from, the method continues to block 425 where one or more media station seeds are selected from each media preference cluster selected. One or more media station seeds 235 and 240 are selected from the each media preference cluster selected 205 and 210 by a set of predetermined selection rules. Some non-limiting examples of media station seeds are songs, videos, artists, albums, genres of music or film, actors, etc. In some embodiments, the media selection rules can dictate selecting a media station seed or seeds based on the number of instances of the media station seed in a media preference cluster. For example, a media station seed such as an artist can be selected based on the number of media items authored by the artist that are in the media preference cluster. In some embodiments, the media selection rules can dictate selecting a media station seed or seeds based on whether a media station seed has been designated as a heat seeker. For example, the media selection rules can dictate that artists and/or songs designated as a heat seeker be selected as a media station seed. In some embodiments, the media selection rules can dictate selecting a media station seed or seeds based on the popularity of a media item. For example, the media selection rules can dictate that artists and/or songs designated as billboard top 100 be selected as a media station seed. In other instances, there may be some minimum threshold value of occurrence within a cluster that an artist must overcome to be considered as a candidate for selection as a media station seed.

In some embodiments, it can be possible to only utilize one media station seed.

After a media station seed or seeds are selected, at block 430 a media station is generated from the media station seed or seeds. In some embodiments the media station generator 310 generates algorithmic media stations. The media station seed or seeds selected are used as inputs into a media station generation module. Using the media station seed or seeds as inputs, the media station generation module automatically generates an online media station customized for the user.

At block 435, the generated media station is provided to an electronic device of the user. The customized media station created may be an algorithmic media station providing a sequence of media items that can be played or executed by a media station player application on a client device.

Figure 5A:
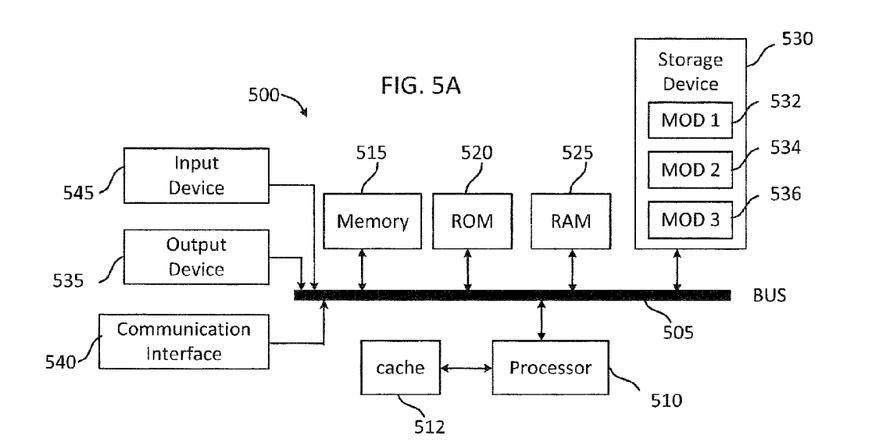
FIGS. 5A and 5B illustrate exemplary possible system embodiments.
Figure 5B:
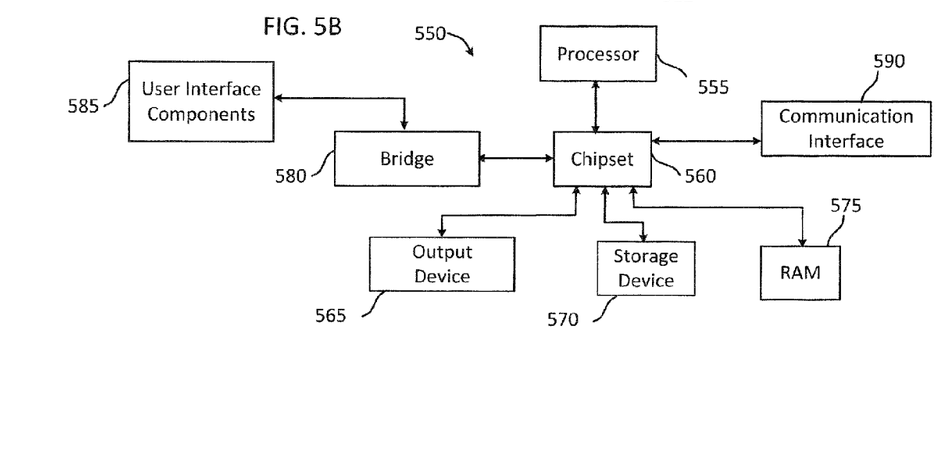

FIG. 5A, and FIG. 5B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A computer-implemented method comprising:
    determining a set of categories associated with a plurality of media items based on one or more characteristics of the plurality of media items, wherein at least one of the set of categories comprises subcategories;
    based on media preferences associated with a user, generating media preference clusters comprising two or more respective subcategories, the media preference clusters being clustered in n-dimensional space, wherein each dimension in the n-dimensional space is a subcategory and each category within the set of categories comprises one or more dimensions in the n-dimensional space;
    ranking the media preference clusters based on a set of predetermined ranking rules applied to the n-dimensional space, to yield a ranking of media preference clusters, the set of predetermined ranking rules defining ranking of the media preference clusters at least partly based on feedback from a user for one or more media items in the media preference clusters;
    selecting a number of top ranking media preference clusters from the ranking of media preference clusters, the number of top ranking media preference clusters being associated with media items having a positive feedback from the user;
    selecting one or more media station seeds from each media preference cluster in the number of top ranking media preference clusters;
    generating one or more algorithmic media stations customized to the user from the one or more media station seeds selected; and
    providing, to an electronic device associated with the user, the one or more algorithmic media stations customized to the user.

2. The method of claim 1, wherein the set of predetermined ranking rules further define the ranking of the media preference clusters based on at least one of a respective number of media items contained in each of the media preference clusters or a respective most recent play time of media items in each of the media preference clusters.

3. The method of claim 1, wherein the one or more media station seeds are selected based on a set of predetermined selection rules, wherein the set of predetermined selection rules dictate selecting media station seeds based on at least one of a determined number of media items authored by a common artist that are within the media preference clusters, a minimum threshold value of times an artist must appear within the media preference clusters, and top artists in the media preference clusters.

4. The method of claim 1, wherein the number of top ranking media preference clusters comprises up to a number of slots available for customized media stations for the user, and wherein a total number of the media preference clusters generated exceeds the second number of slots available for customized media stations.

5. The method of claim 1, wherein the selecting one or more media station seeds further comprises:
determining that a first artist included in at least one of the number of top ranking media preference clusters is a heat seeker; and
selecting the first artist as one of the one or more media station seeds.

6. The method of claim 1, wherein the one or more media station seeds are selected based on a set of predetermined selection rules, wherein the set of predetermined selection rules comprises a seed selection rule for selecting the one or more media station seeds from a plurality of media station seeds based on a respective number of media preference clusters associated with each respective media station seed from the plurality of media station seeds.

7. The method of claim 1, wherein the one or more media station seeds are selected based on a set of predetermined selection rules, wherein the predetermined selection rules dictate selection of the one or more media station seeds based on a determined popularity of the one or more media station seeds.

8. The computer-implemented method of claim 1, wherein the method further comprises:
analyzing a portion of audio content of one or more media items from the plurality of media items;
based on the analyzing, identifying respective subcategories associated with the portion of audio content; and
matching the portion of audio content to the respective subcategories.

9. A system comprising:
one or more processors; and
a computer-readable storage medium having stored therein instructions which, when executed by the one or more processors, cause the one or more processors to:
determine a set of categories associated with a plurality of media items based on one or more characteristics of the plurality of media items, wherein at least one of the set of categories comprises subcategories;
based on media preferences associated with a user, generate media preference clusters comprising two or more respective subcategories, the media preference clusters being clustered in n-dimensional space, wherein each dimension in the n-dimensional space is a subcategory and each category within the set of categories comprises one or more dimensions in the n-dimensional space;
rank the media preference clusters based on a set of predetermined ranking rules applied to the n-dimensional space to yield a ranking of the generated media preference clusters, the set of predetermined ranking rules defining ranking of the media preference clusters at least partly based on feedback from a user for one or more media items in the media preference clusters;
select a number of top ranked media preference clusters from the ranking of the media preference clusters, the number of top ranking media preference clusters being associated with media items having a positive feedback from the user;
select one or more media station seeds from each media preference cluster in the number of top ranked media preference clusters;
generate one or more algorithmic media stations customized to the user from the one or more media station seeds selected; and
provide, to an electronic device associated with the user, the one or more algorithmic media stations customized to the user.

10. The system of claim 9, wherein the set of predetermined ranking rules dictate ranking the generated media preference clusters based on at least one of a respective number of media items contained in the media preference clusters, a respective most recent play time of the media items in the media preference clusters, and user ratings assigned to media items in the media preference clusters.

11. The system of claim 9, wherein a set of predetermined selection rules dictate selecting media station seeds based on at least one of a determined number of media items authored by a common artist that are within the media preference clusters, a minimum threshold value of times an artist must appear within the media preference clusters, and top artists in the media clusters.

12. The system of claim 9, wherein the number of top ranking media preference clusters comprises up to a number of slots available for customized media stations for the user, and wherein a total number of the media preference clusters generated exceeds the number of slots available for customized media stations.

13. The system of claim 9, wherein analyzing a user's media preference data comprises:
inferring, from demographic and geographic location of the user, a musical preference of the user.

14. The system of claim 9, wherein the instructions further cause the one or more processors to:
determine that a first artist included in at least one of the selected media preference clusters is a heat seeker; and
select the first artist as one of the one or more media station seeds.

15. The system of claim 9, wherein predetermined selection rules dictate selection of the one or more media station seeds based on a determined popularity of the one or more media station seeds.

16. The system of claim 9, wherein the one or more processors:
analyze respective audio content of one or more media items from the plurality of media items; and
based on the respective audio content, identify respective subcategories associated with at least a portion of the respective audio content.

17. A non-transitory computer-readable storage medium comprising:
instructions stored on the non-transitory computer-readable storage medium, wherein the instructions, when executed by one or more processors, cause the one or more processors to perform operations comprising:
determining a set of categories associated with a plurality of media items based on one or more characteristics of the plurality of media items, wherein at least one of the set of categories comprises subcategories;
based on media preferences associated with a user, generating media preference clusters, the media preference clusters being clustered in n-dimensional space, wherein each dimension in the n-dimensional space is a subcategory and each category within the set of categories comprises one or more dimensions in the n-dimensional space;

ranking the media preference clusters based on a set of predetermined ranking rules applied to the n-dimensional space, to yield a ranking of the generated media preference clusters, the set of predetermined ranking rules defining ranking of the media preference clusters at least partly based on feedback from a user for one or more media items in the media preference clusters;

selecting a number of top ranking media preference clusters from the ranking of media preference clusters;

selecting one or more media station seeds from each media preference cluster selected;

generating one or more algorithmic media stations customized to the user from the one or more media station seeds from each media preference cluster selected; and providing, to an electronic device associated with the user, the one or more algorithmic media stations customized to the user.

18. The non-transitory computer-readable storage medium of claim 17, wherein the set of predetermined ranking rules dictate ranking the media preference clusters based on a respective number of media items contained in the media preference clusters.

19. The non-transitory computer-readable storage medium of claim 17, wherein a set of predetermined selection rules comprises rules for selecting media station seeds based on at least one of a determined number of media items authored by a common artist that are within the media preference clusters or a minimum threshold value corresponding to a minimum number of times an artist must appear within the media preference clusters.

20. The non-transitory computer-readable storage medium of claim 17, wherein the number of top ranking media preference clusters is equal to a number of slots available for customized media stations for the user, and wherein a total number of the media preference clusters generated is greater than the number of slots available for customized media stations.

21. The non-transitory computer-readable storage medium of claim 17, wherein analyzing a user's media preference data comprises:

inferring, from demographic and geographic location of the user, a musical preference of the user.

22. The non-transitory computer-readable storage medium of claim 17, storing additional instructions which, when executed by the one or more processors, cause the one or more processors to:

provide a preexisting editorial station to the electronic device of a user wherein one or more of the media station seeds selected is an artist of the editorial station.

23. The non-transitory computer-readable storage medium of claim 17, wherein the predetermined selection rules dictate selection of the one or more media station seeds based on a determined popularity of the one or more media station seeds.

24. The non-transitory computer-readable storage medium of claim 17, storing additional instructions which, when executed by the one or more processors, cause the one or more processors to:

analyze respective audio content of one or more media items from the plurality of media items; and based on the respective audio content, identify respective subcategories associated with at least a portion of the respective audio content.

* * * * *